United States Patent [19]

Kaufmann et al.

[11] Patent Number: 5,328,744
[45] Date of Patent: Jul. 12, 1994

[54] PANEL HAVING A CORE WITH THERMOPLASTIC RESIN FACINGS

[75] Inventors: Christine M. Kaufmann, Boothwyn, Pa.; Dale L. Murschell, Woodstown, N.J.; Dennis A. Nollen, Newark, Del.; Anthony R. Saracino; Joseph D. Trentacosta, both of Wilmington, Del.

[73] Assignee: E. I. Du Pont de Nemours and Company, Wilmington, Del.

[21] Appl. No.: 592,179

[22] Filed: Oct. 9, 1990

[51] Int. Cl.$^5$ ............................................. B32B 3/12
[52] U.S. Cl. ................................. 428/116; 52/806; 428/117; 428/192
[58] Field of Search ............... 156/245, 292, 322, 197; 264/255, 257, 320, 321, 324; 428/116, 285, 308.4, 241, 310.5, 192, 117; 52/806

[56] References Cited

U.S. PATENT DOCUMENTS

| | | | |
|---|---|---|---|
| 2,983,038 | 5/1961 | Johnson | 428/116 |
| 3,148,269 | 9/1964 | Van Hartesveldt et al. | 219/243 |
| 3,157,069 | 11/1964 | Van Hartesveldt et al. | 78/25 |
| 3,159,526 | 12/1964 | Van Hartesveldt et al. | 161/261 |
| 3,166,110 | 1/1965 | Van Hartesveldt et al. | 144/327 |
| 3,185,073 | 5/1965 | Van Hartesveldt et al. | 100/93 |
| 3,185,614 | 5/1965 | Van Hartesveldt et al. | 161/261 |
| 3,206,009 | 9/1965 | Wahl | 198/208 |
| 3,207,062 | 9/1965 | Van Hartesveldt et al. | 100/93 |
| 4,049,487 | 9/1977 | Kunz | 156/436 |
| 4,061,812 | 12/1977 | Gilwee, Jr. et al. | 428/117 |
| 4,186,044 | 1/1980 | Bradley et al. | 156/273 |
| 4,315,555 | 2/1982 | Nakaya et al. | 181/168 |
| 4,543,289 | 9/1985 | Park | 428/304.4 |
| 4,598,007 | 7/1986 | Kourtides et al. | 428/408 X |
| 4,889,763 | 12/1989 | Brambach | 428/246 |
| 4,897,146 | 1/1990 | Inzinna | 156/462 |
| 4,931,340 | 6/1990 | Baba et al. | 428/192 X |
| 4,933,131 | 6/1990 | Okey et al. | 428/116 X |
| 4,954,382 | 9/1990 | Riefler et al. | 428/116 |
| 5,043,127 | 8/1991 | Brambach | 264/257 |
| 5,087,500 | 2/1992 | Kasper et al. | 428/116 |
| 5,186,999 | 2/1993 | Brambach | 428/117 |
| 5,238,725 | 8/1993 | Effing et al. | 428/116 |

FOREIGN PATENT DOCUMENTS

| | | | |
|---|---|---|---|
| 0262092 | 3/1988 | European Pat. Off. | |
| 0264495 | 4/1988 | European Pat. Off. | |
| 0269148 | 6/1988 | European Pat. Off. | B32B 5/22 |
| 0300522 | 1/1989 | European Pat. Off. | B05D 3/10 |
| 0365677 | 5/1990 | European Pat. Off. | |
| 0400599 | 12/1990 | European Pat. Off. | 428/116 |
| 2188866 | 4/1986 | United Kingdom | 428/116 |

Primary Examiner—Henry F. Epstein

[57] ABSTRACT

A panel comprising a core member in the form of a honeycomb structure of aramid paper and thermoplastic resin sheet material reinforced with a fiber selected from the group consisting of aramid, carbon and glass bonded to both sides of said core member to form facings therefor.

5 Claims, 6 Drawing Sheets

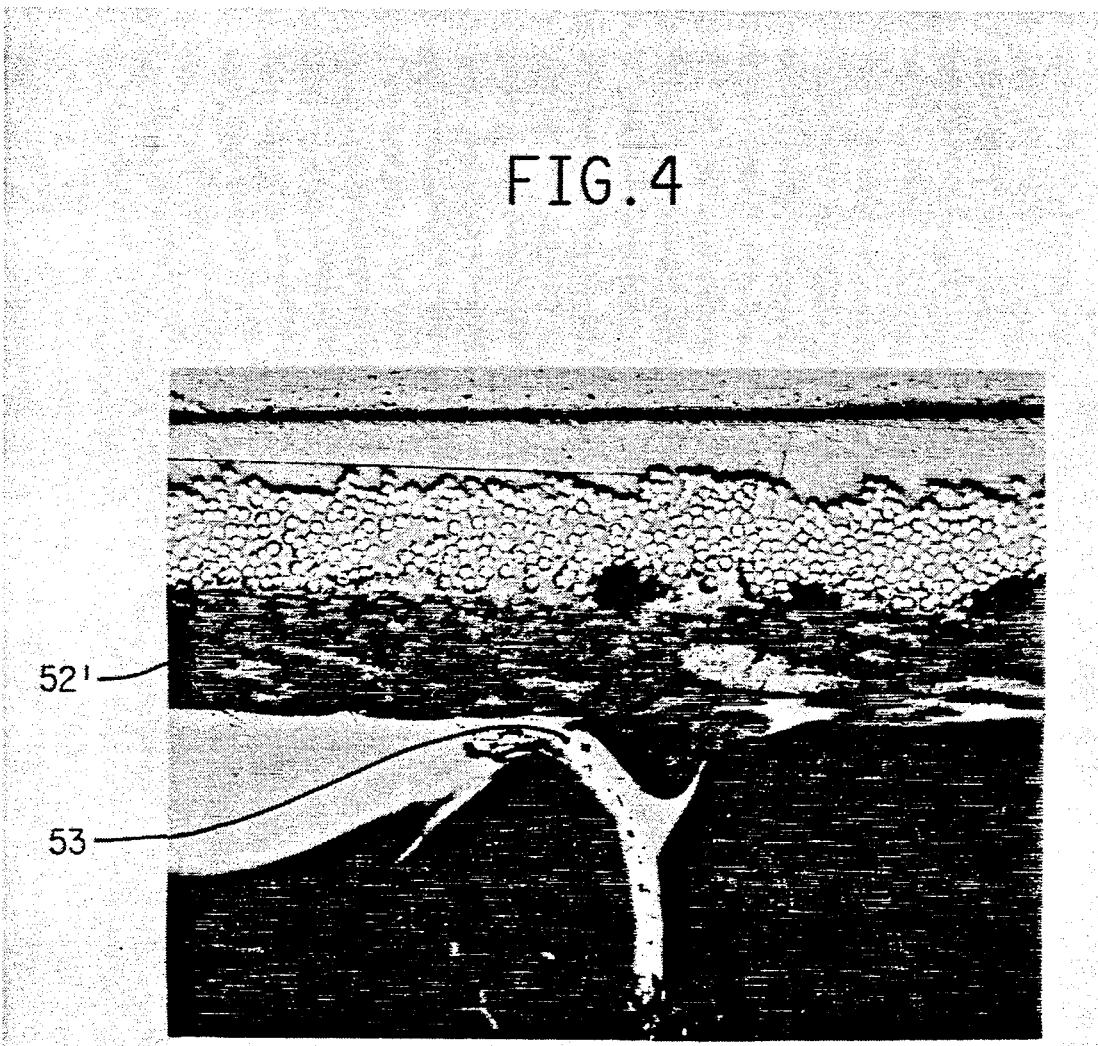

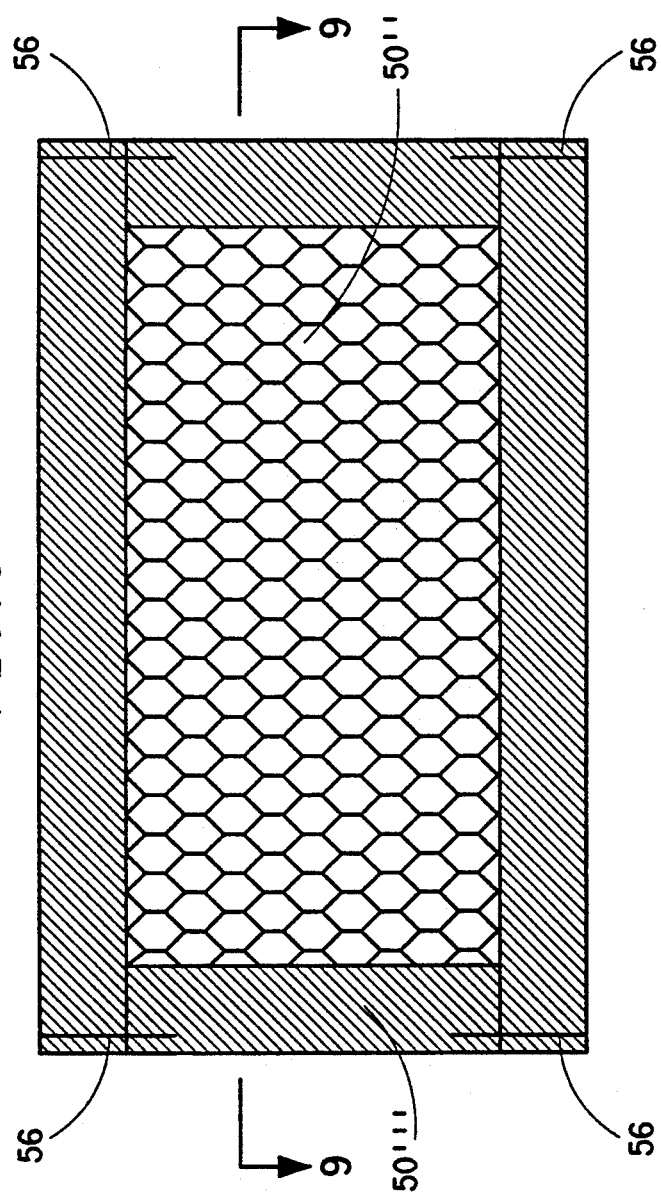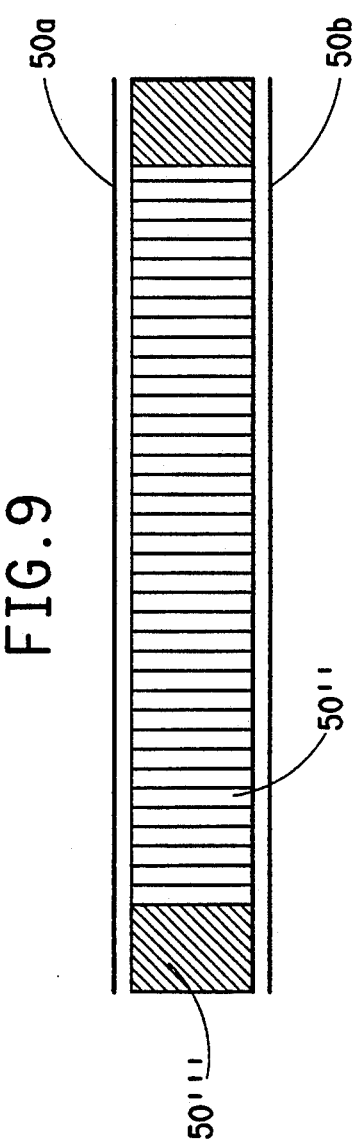

PANEL HAVING A CORE WITH THERMOPLASTIC RESIN FACINGS

BACKGROUND OF THE INVENTION

This invention relates to a method for rapidly forming structural panels having a core faced with thermoplastic resin facings.

In the manufacture of composite panels with resin facing material bonded to core structures, it has been the practice to use facing materials made with thermosetting resins which are cured as the panel is consolidated in an autoclave, oven or press which is a costly and a time-consuming operation. Attempts to use high performance thermoplastic resin sheet material as facings for these panels require higher processing temperatures than thermoset resins. This leads to decomposition of core materials and to panels with low adhesion between the facings and the core material when the facings are resin reinforced with fibers.

SUMMARY OF THE INVENTION

According to the method of this invention, a composite structure is formed from a core and a thermoplastic resin sheet material by bonding the thermoplastic resin sheet material to at least one side of the core by passing the core and the thermoplastic resin sheet material in mating surface contact through a belt press for a residence time of less than 2.3 min. under a positive pressure, while heating the core and the thermoplastic sheet material to a temperature of from about 480° F. to about 710° F. in the belt press and cooling the core and the sheet material in the belt press while maintaining said positive pressure. The residence time and process temperature are adjusted to give optimum resin impregnation while minimizing core or organic fiber facing reinforcement degradation.

Another embodiment of the invention is a panel formed by the above method that includes a core member and a fiber reinforced thermoplastic resin sheet material bonded to at least one side of the core member to form a facing therefor. The thermoplastic resin is between 30 to about 65 weight percent of the facing. The peel strength or adhesion between the facing and the core is greater than 10 lbs./3" sample.

Useful cores are honeycomb structures of aramid paper, aluminum or glass fibers and foams such as polymethacrylimide and polyetherimide foams or polyurethanes and polyisocyanurate foams.

Suitable thermoplastic resins include polyesters, polyamides, copolyamides polyolefins and polyetherketoneketone (PEKK) both amorphous and semicrystalline. The polyaryletherketone resin consists of repeating units (as disclosed in U.S. Pat. No. 4,937,135) of 1,4 phenylene groups (T, terephthalyl groups) and 1,3 phenylene groups (I, isophthalyl groups); the T:I ratio being 50:50 to 80:20, preferably 60:40 to 70:30. Polyetheretherketone (PEEK), e.g., Stabar TM from ICI, polyetherimide (PEI), e.g., Ultem TM from GE, and polyethersulfone (PES), e.g., Radel TM from Amoco. The ratio of resin to reinforcement can vary. Such properties as peel strength increase linearly with increasing resin content. However, extra resin adds weight to the finished panel which is undesirable in aerospace applications. The preferred resin contents are similar to the corresponding thermoset values for self-bonding prepregs, i.e. about 50% by weight for reinforcement with fabrics of Kevlar TM aramid fibers, about 45% by weight for woven carbon fiber facings and about 40% by weight for fiberglass facings. For panels with maximum bending stiffness, the thermoplastic resin and fiber reinforcement may be consolidated in a separate step under high pressure before bonding to the core in the method described above.

Useful fibers for reinforcing the thermoplastic resin facings are carbon, aramid and glass fibers.

BRIEF DESCRIPTION OF THE DRAWINGS

FIG. 4 is a photomicrograph of a partial elevation view in cross section of a panel formed with a honeycomb core of aramid paper.

FIG. 8 is a schematic illustration plan view of a panel having a form edge trim for a honeycomb core.

FIG. 9 is a section of FIG. 8 taken along the line 9—9.

DETAILED DESCRIPTION OF THE PREFERRED EMBODIMENT

Figure 1A:
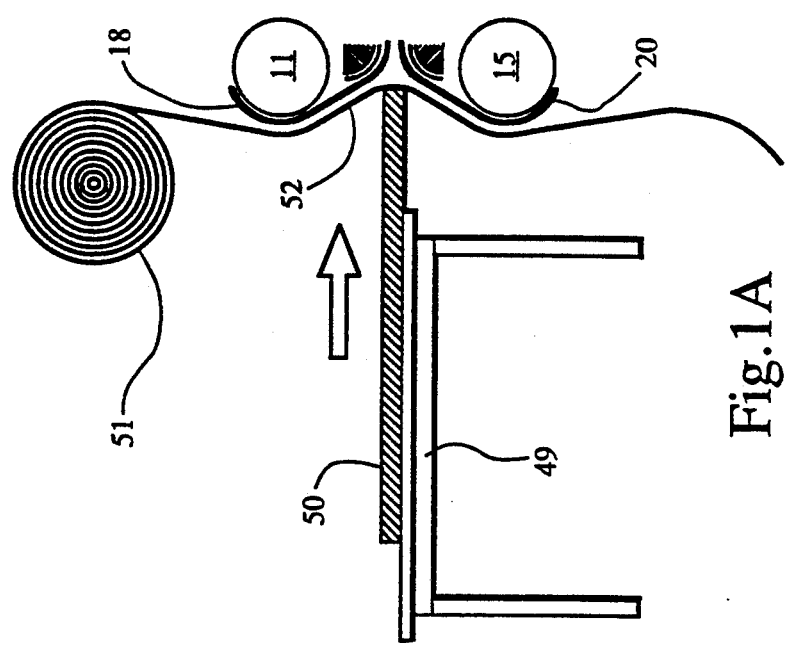
FIG. 1A is a schematic side view of a batch mode operation.
Figure 1:
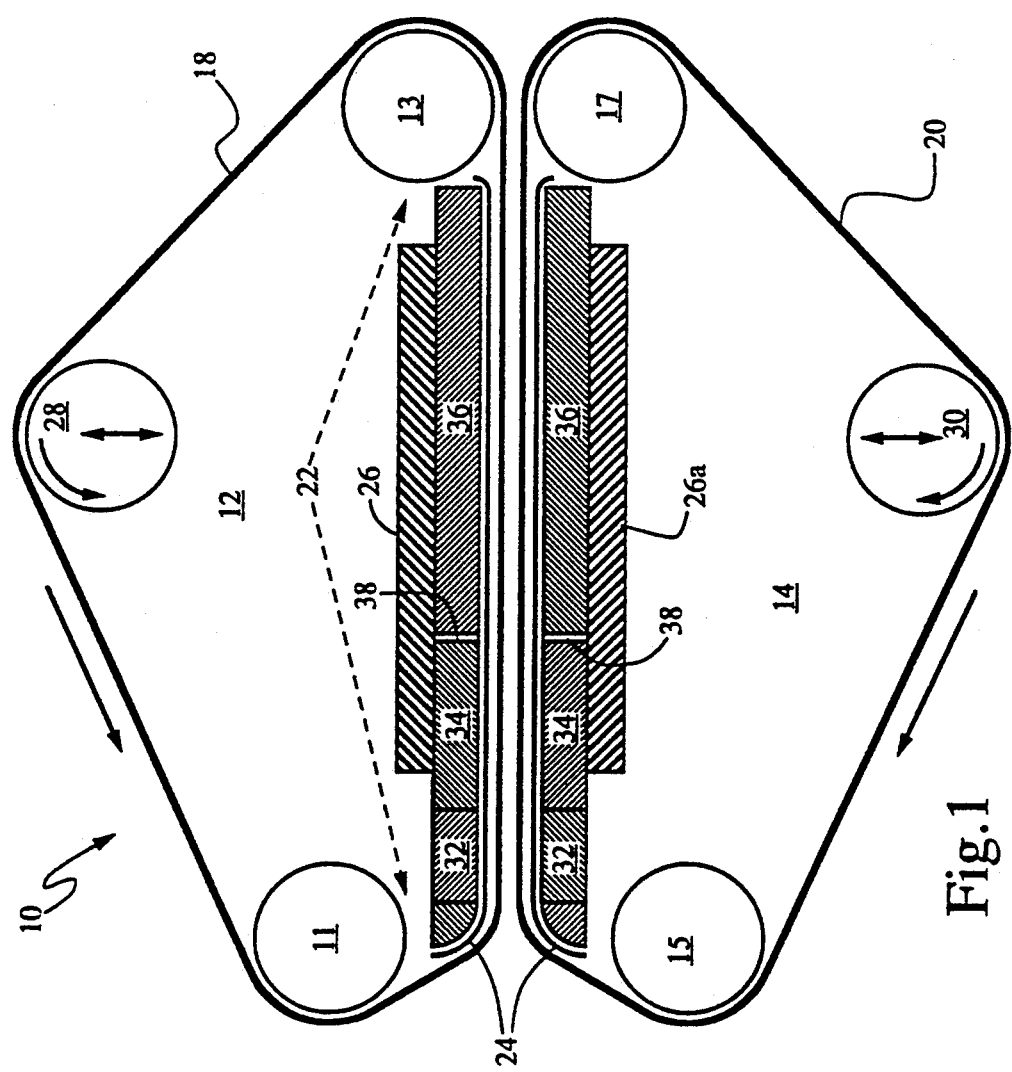
FIG. 1 is a schematic side view of a belt press suitable for practicing the method of this invention.

In FIG. 1 the belt press has been designated generally by the numeral 10 and shown to include substantially identical upper and lower sections 12 and 14, respectively, that are aligned one above the other. Each section includes a pair of belt rolls 11, 13 on the upper and 15, 17 on the lower. The rolls are rotatably mounted to frame (not shown). Traveling around rolls 11, 13 is a metal alloy belt 18 and around rolls 15 and 17 an identical belt 20. Both belts coact to form a constant height nip section within the frame hereafter referred to as the heating and cooling zone 22. Each belt is supported on its back side in the zone 22 by a stationary antifriction bearing 24 sandwiched between the stationary zone and the moving belts. Belt tension rolls 28, 30 are mounted for rotatable and vertical movement as indicated by the direction arrows. The belts are driven in the direction of the arrows by conventional drive means (not shown). Each zone 22 is composed of heating sections 32, 34, and cooling sections 36 separated by thermal barriers 38. The zones are attached to the frame with mechanical shims 26, 26a in a fashion to allow vertical positioning for maintaining a constant spacing between the belts.

There are numerous heating and cooling concepts practiced by commercial belt press suppliers. Heating systems use an electrical heat source to generate heat and then carry the heat to the belt via pneumatic, hydraulic and regular conduction techniques. The source of cooling is usually a water supply with the heat being carried from the belt by pneumatic, hydraulic and conductive sytems.

In order to provide capability for the belt press to operate at temperatures above 540° F. the static anti friction bearings 24 of woven screen must be permanently impregnated with either a dried graphite paste, a dried molylube N(molybdenum) paste or a graphite sheeting, which are all high temperature and low volatility substrates which fill the voids in the screen. The bearing surface must then be coated periodically with a high temperature and low volatility lubricant such as C5A (Fel Pro, Inc., Skokie, Ill.), a copper based lubricant, Molylube-16 (Bel-Ray Co., Inc., Farmingdale, N.J.), a molybdenum based lubricant, or Krytox TM paste (Du Pont), a fluorinated lubricant.

In a batch mode of operation shown in FIG. 1A, a layup consisting of a core member 50 and facings 50a comprised either of preimpregnated fiber reinforced sheets or sheets of thermoplastic resin and fabrics of high performance fibers (glass, aramids or carbon) is introduced from platform 49 into the nip between the belts 18 and 20. If necessary, a release film 52 is unrolled from the supply roll 51 to cover belts 18 and 20. The facings are bonded to the core as the layup passes through zone 22 of FIG. 1 under a positive pressure created by the difference in the opening between the belts and the thickness of the core and its facings. Usually the bonding pressure is limited by the compressive strength of the core at the processing temperature. A stationary platen press of the type known to one skilled in the art could also be used to heat and bond the facing 50a to the core 50.

Figure 2:
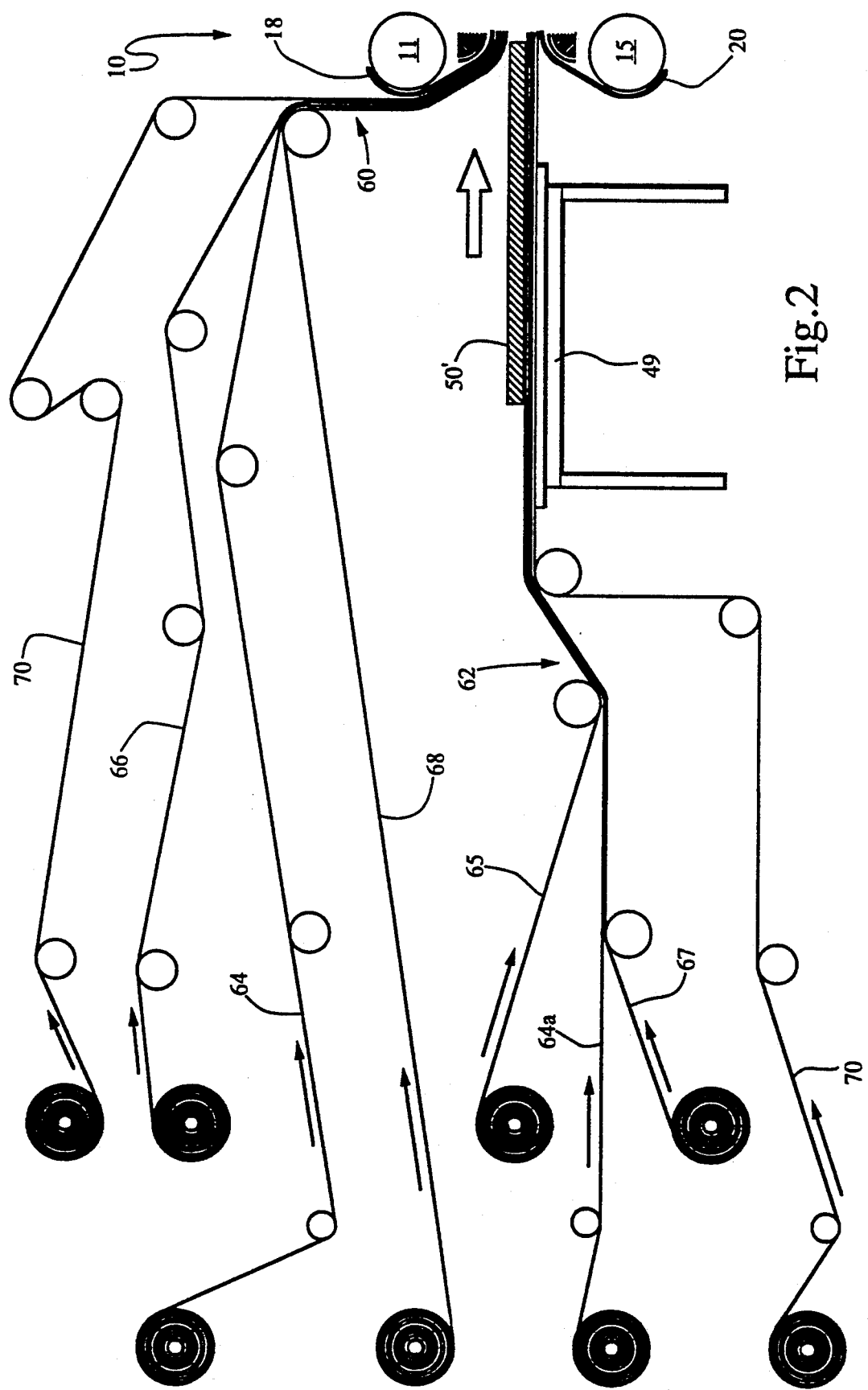
FIG. 2 is a schematic side view of a continuous mode operation.

While FIG. 1A shows a system set up for a batch mode of operation, it is to be understood that a (single step) continuous mode of operation could be obtained as disclosed in FIG. 2 wherein a continuous core 50' is fed to the nip of the belt press 10 from platform 49. Upper and lower facings 60, 62, respectively, are formed from a reinforcing fabric 64, sandwiched between thermoplastic resin sheets 66, 68 (in the case of upper facing 60) and 64a sandwiched between thermoplastic resin sheets 65, 67 (in the case of lower facing 62) a release film 70 such as Kapton TM is fed between the upper and lower facings and the belts of the belt press 10. Kapton TM, aluminum or Teflon TM coated glass fabric are needed for a release agent with certain thermoplastic sheets but may not be required by others. The panels are formed in the belt press in substantially the same manner as described above except the operation is continuous.

Figure 3:
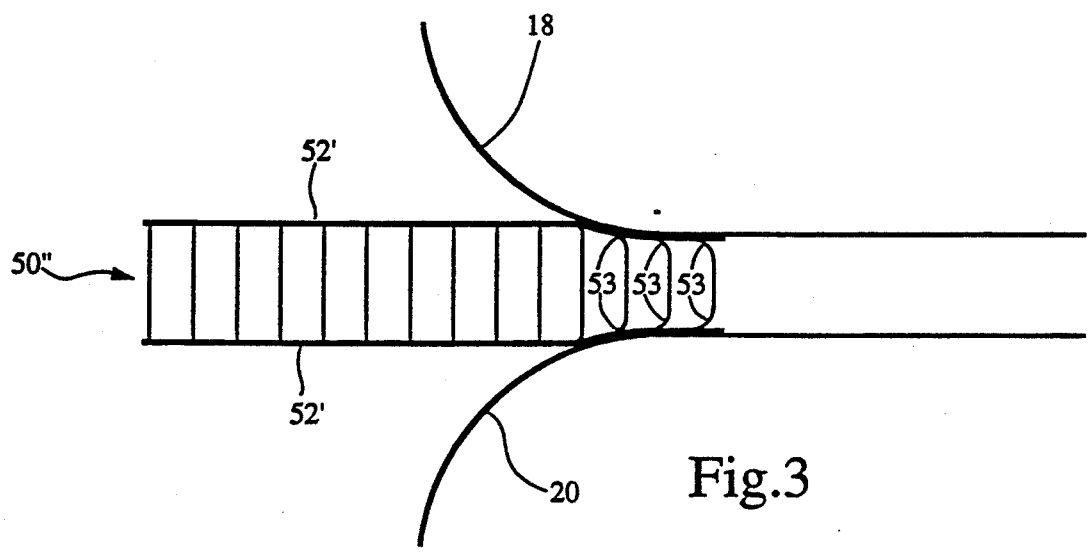
FIG. 3 is a schematic side view showing a honeycomb core and facings entering the nip of a belt press.
Figure 5:
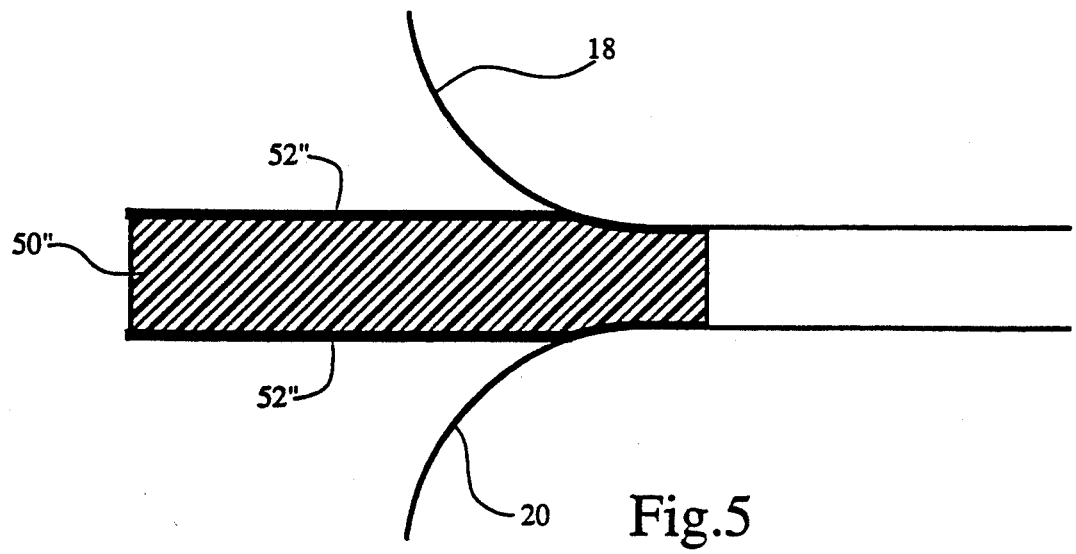
FIG. 5 is a schematic side view showing a foam core and facings entering the nip of a belt press.

Panels made according to the above procedure are then tested for damage tolerance via the climbing drum peel test (ASTM D781-76; reapproved 1986). Panels exhibiting at least 10 pounds of peel per 3" sample have sufficient damage tolerance for use in aircraft interiors. If higher peel strengths are desired with honeycomb of Nomex TM, crushed-core panels can be made. With the above technology, peel strengths can be enhanced by as much as 3-4 times versus noncrushed core panels. This is because the bonding surface area has been increased. More particularly, as shown in FIGS. 3 and 4, a honeycomb core member 50" is introduced into the nip between belts 18, 20 along with a fiber reinforced resin facing 52'. As they pass through the nip under positive pressure, the cell walls of the honeycomb structure are folded into hooklike configurations 53 pointed generally in a direction opposite to the direction of movement of the core, thus increasing the surface area of the honeycomb structure contacting the facings 52'. With the new thermoplastic facing technology, the core is heated above its softening point such that the cells are crushed much more uniformly than with conventional thermoset crushed-core panels which have considerable cell damage after panel fabrication leading to a decrease in certain physical properties such as bending stiffness. An alternate embodiment using a foam core is shown in FIG. 5 wherein a foam core member 50''' is introduced into the nip between belts 18 and 20 along with a fiber reinforced resin facings 52".

Figure 6:
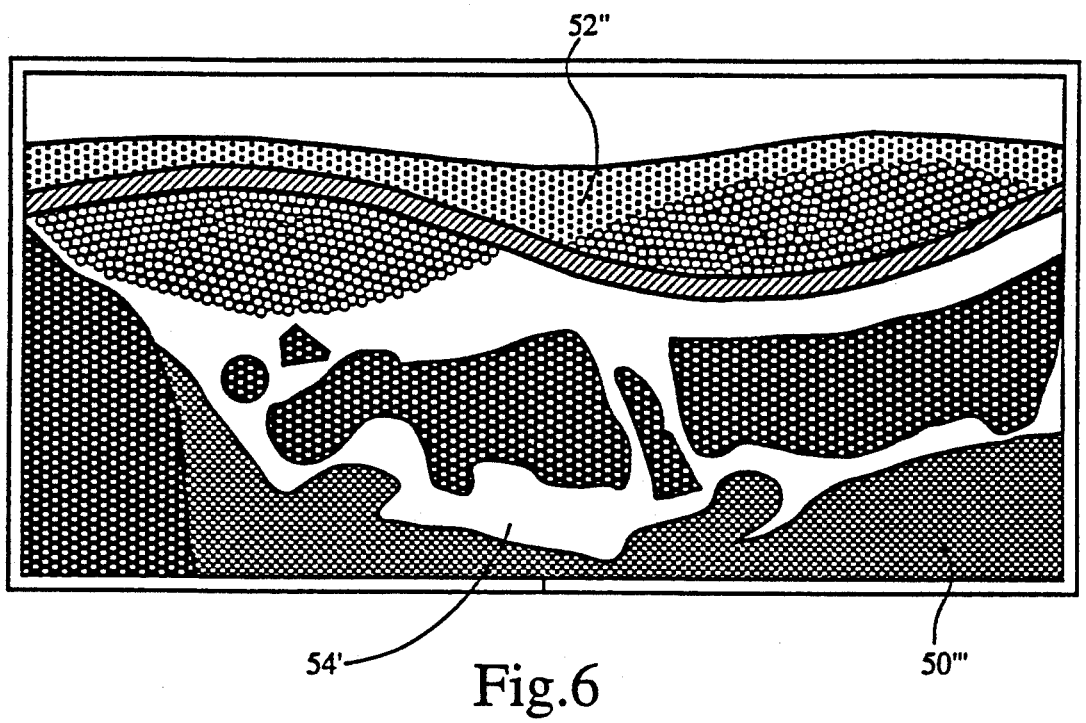
FIGS. 6 and 7 are schematic illustrations of a partial elevation view in cross section of a panel formed with foam cores of thermoplastic and non-thermoplastic foam, respectively.

If the foam is thermoplastic in nature, as shown in FIG. 6, a strong bond 54' is formed between the foam and the facing resin as defined by peel strength exceeding 30 lbs./3" width. This strong bond results from fusion bonding (i.e. melting together of the facing resin and the melted foam surface) between the resin and the foam at the interface. The heat from the belt press melts the surface of the foam as seen by thickening of the foam cell walls near the interface. The heat is not applied long enough to penetrate through the thickness of the foam, therefore, the foam interior remains intact. Examples of foams which will bond to thermoplastic PEKK resin in this manner are polymethacrylimide foams (Rohacell TM) and polyetherimide foams (Airex TM).

Figure 7:
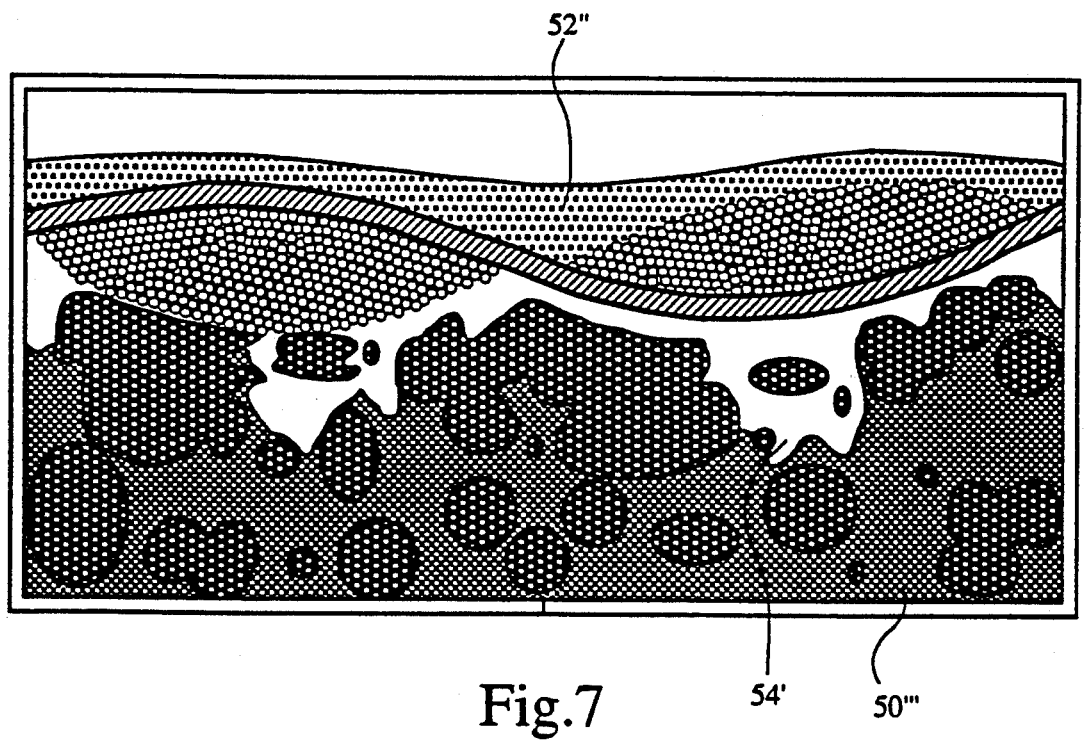

If the foam is not thermoplastic in nature, as shown in FIG. 7, a strong bond 54' is formed between the foam and facing resin which results from flow of the PEKK polymer into the cells at the interface, resulting in a bond of increased surface area at the interface. The resin flows into and around the surface cell walls of the foam core. The strong bond is characterized by peel strength of greater than 25 lbs./3" width. Examples of foams which will bond to PEKK resin in this manner are polyurethanes and polyisocyanurates (Last-A-Foam TM).

In addition to being used as core materials, these foam materials have been demonstrated for use as an edge trim to honeycomb-cored sandwich panels as shown in FIGS. 8 and 9. The foam edge trim member acts as a barrier to moisture for the honeycomb, as a location for fastener attachment, and also as a smooth edge finish for an aircraft part. The foam edge 50''' is held in place around the honeycomb core member 50" for processing by a variety of methods. In the preferred method a screw 56 is used to mechanically fasten the foam strips together at each splice point. Other types of fasteners at the splice point which have been demonstrated include Kapton TM tape or fast drying adhesives. Ultrasonic bonding of the face sheets to the core or a wooden frame around the edges of the panel have been demonstrated as techniques to hold the foam in place without fasteners.

EXAMPLES

Example 1

The components of the laminate were dried for at least 2 hours at 120° C. and then laid up in the following manner. Three pieces of amorphous (60/40 T/I) PEKK film (1.5 mils thick, 150 melt index as measured by ASTM 1238-79 procedures) were placed on the core bonding side of Kevlar TM 49 aramid fiber (by Du Pont) Style 285 fabric (5.1 oz./sq. yd., 9 mils thick) and one piece on the belt contact side to form the top facing. The bottom facing consisted of a balanced 2 pieces of film on each side of the Kevlar TM. The resin percentage by weight of the facings was 54%. The facings were placed on each side of a piece of honeycomb of Nomex TM aramid paper (by Du Pont) (3 lbs./cu. ft., ⅛" cell, ¼" thick). The warp direction of the fabric was aligned with the ribbon direction of the core. The warp face of the fabric was placed against the core. The facing layers were anchored to the core material with two 1" wide Kapton TM tape strips along the leading edge of the sample. The belt press (substantially as shown in FIG. 2) was set to a constant temperature of 650° F. and a belt speed of 15" per min (approximately 32 sec. residence time in the heat zone). The gap between the upper and lower belts was fixed to give a panel thickness of 0.518". A Kapton TM polyimide release sheet (by Du Pont) was placed over both sides of the entire laminate. The front edge of the sample, perpendicular to the warp direction of the facing fabric and containing the Kapton TM tape anchors, was inserted into the belt press. Once consolidated, the Kapton TM release film and tape anchors were removed from the sample.

The panel was cut into three 3"×12" samples (length perpendicular to the warp direction). Peeling the 3 ply PEKK/Kevlar TM/1 ply PEKK facing from the core gave an average peel strength of 28.4 lbs./3" sample.

Example 2

The components of the laminate were dried for at least 2 hours at 120° C. and then laid up in the following manner. Two pieces of amorphous (60/40 T/I) PEKK film (1.5 mils thick, 150 melt index as measured by ASTM 1238-79 procedures) were placed on each side of Style 7781 glass (9 mils thick). The facesheet was consolidated at belt press conditions of 650° F. and 15"/min. belt speed (about 32 sec. in the heating zone). The gap between upper and lower belts was adjusted to give a sample thickness of 0.012". A second facesheet was consolidated in an identical fashion. The resin percentage by weight of the facings was 39%. The described facings were then placed on each side of a piece of honeycomb of Nomex TM (3 lbs./cu. ft., ⅛" cell, ½" thick). The facings were anchored to the core material with two 1" wide Kapton TM tape strips along the leading edge of the sample. The belt press was set to a constant temperature of 625° F. and a belt speed of 15" per min. (residence time approximately 32 sec. in the heat zone). The gap between the upper and lower belts was fixed to give a sample thickness of 0.516". A Kapton TM release sheet was placed over both sides of the entire laminate. The front edge of the sample, perpendicular to the warp direction of the facing fabric and containing the Kapton TM tape anchors, was inserted into the belt press. The belt press conditions were then adjusted to a constant 500° F. and 3.5"/min. (residence time about 2.3 min. in the heat zone) belt speed and the panel was inserted as before. Once consolidated, the Kapton TM release film and tape anchors were removed from the sample.

The panel was cut into three 3" by 8" samples (length parallel to the core ribbon direction). The specimens gave an average short beam shear value of 100 psi.

Example 3

The components of the laminate were dried for at least 2 hours at 120° C. and then laid up in the following manner. Two pieces of amorphous (60/40 T/I) PEKK film (1.5 mils thick, 180 melt index) were placed on each side of a Kevlar TM Style 281 fabric, 5.1 oz./sq. yd., 10 mils thick, to form the facing. To achieve a sample size of 14"×17", 6.5" strips of the above mentioned amorphous PEKK film were concurrently placed over a 14"×17" piece of core material being careful not to overlap film edges. Identical facings were placed on each side of a piece of honeycomb of Nomex TM (3 lbs./cu. ft., ⅛" cell, ½" thick). The warp direction of the fabric was aligned with the ribbon direction of the core. The facing layers were anchored to the core material with two 2" wide Kapton TM tape strips along the leading edge of the sample. The belt press was set to a constant temperature of 650° F. and a belt speed of 12" per min. (residence time approximately 48 sec. in the heat zone). The gap between the upper and lower belts was set to achieve a total sample thickness of 0.36" (70% of the theoretical thickness). A Kapton TM release sheet was placed over both sides of the entire laminate according to the above described procedure. The front edge of the sample, perpendicular to the warp direction of the facing fabric and containing the Kapton TM tape anchors, was inserted into the belt press. The Kapton TM release film and the tape anchors were removed from the sample. The average sample thickness, as measured by a micrometer, was found to be 0.387". Three 3"×12" samples (long direction perpendicular to the warp direction) were cut from the sample. The average peel strength was determined to be 56 lbs./3" sample.

Example 4

The components of the laminate were dried for at least 2 hours at 120° C. and then laid up in the following manner. Two pieces of polyethermide Ultem TM film were placed on each side of a Kevlar TM Style 281 fabric, 5.1 oz./sq. yd., 10 mils thick, to form the facing. Identical facings were placed on each side of a piece of honeycomb of Nomex TM (3 lbs./cu. ft., ⅛" cell, ½" thick). The warp direction of the facing fabric was aligned with the ribbon direction of the core. The facing layers were anchored to the core material with two 1" wide Kapton TM tape strips along the leading edge of the sample. The belt press was set to a constant temperature of 650° F. and a belt speed of 15"/min. (residence time about 32 sec. in the heat zone). The gap between the upper and lower belts was set to achieve a total sample thickness of 0.44" (85% theoretical gap). A Kapton TM release sheet was placed over both sides of the entire laminate according to the above described procedure. The front edge of the sample, perpendicular to the warp direction of the facing fabric and containing the Kapton TM tape anchors, was inserted to the belt press. The Kapton TM release film and the tape anchors were removed from the sample. A Climbing Drum Peel test was performed on three samples and had an average result of 11.0 lbs./3" sample.

Example 5

The components of the laminate were dried for at least 2 hours at 120° C. and then laid up in the following manner. Two pieces of 70/30 T/I, PEKK film were placed on the top side of a Kevlar TM 49 Style 281 fabric (5.1 oz./sq. yd., 10 mils thick) and two pieces of 60/40 T/I PEKK film (180 melt index as measured by ASTM 1238-79) on the bottom to form the facing. The percentage of resin by weight was about 49. Identical facings were placed on each side of a piece of honeycomb of Nomex TM (3 lbs./cu. ft., ⅛" cell, ½" thick). The 60/40 T/I film was placed next to the honeycomb core on both sides. To achieve a sample size of 13"×17", 6.5" strips of the above mentioned amorphous PEKK films were concurrently placed over a 14"×17" piece of the core material being careful not to overlap film edges. The warp direction of the fabric was aligned with the ribbon direction of the core. The facing layers were anchored to the core material with two 1" wide Kapton TM tape strips along the leading edge of the sample. The belt press was set to a constant temperature of 650° F. and a belt speed of 15"/min. (residence time approximately 32 sec. in the heat zone). The gap between the upper and lower belts was fixed to 0.360" (70% theoretical thickness). A Kapton TM release sheet was placed over both sides of the entire laminate. The front edge of the sample, perpendicular to the warp direction of the facing fabric and containing the Kapton TM tape anchors, was inserted into the belt press. Once consolidated the Kapton TM release film and tape anchors were removed from the sample. The average sample thickness, as measured by a micrometer, was found to be 0.365".

Three 3"×12" samples (length perpendicular to the warp direction) were cut from the sample. The peel strength was determined to be 27 lbs./3" sample.

Example 6

The components of the panel were dried for at least 2 hours at 120° C. and then laid up in the following manner. Three pieces of amorphous polyetheretherketone (PEEK) film (Stabar K200-782), 1.06 oz./sq. yd., melt index 19@360° C. as measured by ASTM 1238-79 procedures, were laid over a piece of ½ thick Nomex TM honeycomb core. Then a piece of 7781 glass fabric was placed atop the film layers with the warp direction of the fabric parallel to the core ribbon direction and the warp face towards the core. Three more layers of film were then placed on the fabric. This layup was intended to produce a resin content on the face sheets of approximately 41%. The film and fabric stacked layup was duplicated on the reverse side of the core. The layers of film and fabric were anchored to the core by ultrasonic welder along the leading edge of the panel. The belt press was set to a constant temperature of 680° F. and a belt speed of 15" per min. (about 32 sec. residence time in the heat zone). The gap between the belts was adjusted to give a product thickness of 0.44", or 85% of the theoretical thickness expected. A Kapton TM release sheet was placed over both sides of the entire laminate. The laminate was placed into the belt press such that the ribbon direction of the core was parallel to the machine direction, with the edge that had been ultrasonic spot welded entering the belt press first. After consolidation, the release sheets were removed from the surfaces of the laminate.

Three 3"×12" samples were cut from the panel, length perpendicular to the core ribbon direction. The average peel strength of the three samples was found to be 15 lbs./3" sample.

Example 7

The components of the laminate were dried for at least 2 hours at 120° C. and then laid up in the following manner. Two pieces of amorphous (60/40 T/I) PEKK film (130 melt index as measured by ASTM 1238-79 procedures) were placed on each side of a Kevlar TM 49 Style 281 fabric, 5.1 oz./sq. yd., 10 mils thick, to form the facing. The percentage of resin by weight was calculated to be 51%. Identical facings were placed on each side of a piece of honeycomb of aluminum (3 lbs./cu. ft., ⅛" cell, ½" thick). To achieve a sample size of 13"×17", 6.5" strips of the above mentioned amorphous PEKK film were concurrently placed over a 14"×17" piece of the core material being careful not to overlap film edges. The warp direction of the fabric was aligned with the ribbon direction of the core. The facing layers were anchored to the core material with two 1" wide Kapton TM tape strips along the leading edge of the sample. The belt press was set to a constant temperature of 650° F. and a belt speed of 15"/min. (residence time approximately 32 sec. in the heat zone). The gap between the upper and lower belts was fixed to give a sample thickness of 0.516". A Kapton TM release sheet was placed over both sides of the entire laminate. The front edge of the sample, perpendicular to the warp direction of the facing fabric and containing the Kapton TM tape anchors, was inserted into the belt press. Once consolidated the Kapton TM release film and tape anchors were removed from the sample. The average sample thickness, as measured by a micrometer, was found to be 0.523".

Three 3"×12" samples (length perpendicular to the warp direction) were cut from the sample. The peel strength was determined to be 11.9 lbs./3" sample.

Example 8

The components of the laminate were drid for at least 2 hours at 120° C. and then laid up in the following manner. Two pieces of amorphous (60/40 T/I) PEKK film (150 melt index) were placed on either side of a Kevlar TM Style 281 fabric, 5.1 oz./sq. yd., 10 mils thick, to form the panel facings. One inch wide strips of ½ thick foam (Last-A-Foam TM FR-10118 polyisocyanurate by General Plastics Mfg. Co., Tacoma, Wash.) were cut from a sheet of foam and assembled into a frame with outer dimensions measuring 12"×16". The strips of foam were held together using a rigid wooden frame with inner dimensions of 12"×16". A piece of Nomex TM honeycomb core cut exactly to 10"×14" was fitted into the center of the frame. The identical facings described above were then placed on each side of the foam-framed Nomex TM honeycomb such that the warp direction of the fabric ran in the ribbon direction of the honeycomb core. One inch wide strips of Kapton tape were used to anchor the facings to the frame along the leading edge of the sample. The belt press was set to a constant temperature of 650° F. with a belt speed of 15"/min. (residence time approximately 32 secs. in the heat zone). The gap between the upper and lower belts was set to produce a finished sample thickness of 0.516" or 100% of the theoretical thickness. The front edge of the sample with the Kapton TM tape anchors) was inserted into the belt press. This sample was covered with Kapton TM film as a release agent to prevent the sample from sticking to the belts. Once consolidated the Kapton TM release film and tape anchors were removed from the sample. The finished panel edges were trimmed, leaving ⅛" width of foam around the panel. The average thickness of the foam trimmed portion of the panel, as measured by a micrometer, was 0.507" and the average thickness of the honeycomb cored portion of the sample was measured to be 0.494".

Example 9

The components of the laminate were dried for at least 2 hours at 120° C. and then laid up in the following manner. Identical panel facings as described in Example 8 were laid up. 1.5" strips of ½" thick foam (Rohacell TM 200 WF polymethacrylimide by Rohm Tech, Inc., Malden, Mass.) were cut from a foam sheet and assembled into a frame with outer dimensions measuring 12"×12". The strips of foam were anchored together using Wapton TM tape. A piece of Nomex TM honeycomb core cut exactly to 9"×9" dimensions was fitted into the center of the frame. The identical facings were placed on either side of the foam-framed Nomex TM honeycomb with the warp direction of the fabric parallel to the ribbon direction of the honeycomb core. The Kapton TM tape was used to anchor the facings in place along the leading edge of the sample. The belt press was set to a constant temperature of 650° F. with a belt speed of 15"/min. (residence time about 32 sec. in the heat zone). The gap between the upper and lower belts was set to produce a finished sample thickness of 0.516". The panel was then consolidated in the belt press using Kapton TM release film. After processing, the Kapton TM film and tape were removed. This sample was then reprocessed to apply a decorative laminate to one side of the panel. The belt press was set to a constant temperature of 250° F. and 6"/min. (residence time about 80 sec. in the heat zone). The panel was consolidated using Kapton TM release film which was removed after processing. The finished average thickness of the foam was measured to be 0.521" and the honeycomb core thickness was 0.516".

Example 10

The components of the laminate were dried for at least 2 hours at 120° C. and then laid up in the following manner. Two pieces of amorphous (60/40 T/I) PEKK film (150 melt index) were placed on either side of a Kevlar TM Style 281 fabric, 5.1 oz./sq. yd., 10 mils thick, to form the panel facings. Dimensions of the fabric and film measured 16"×25". A piece of foam core (Rohacell TM 200 WF polymethacrylimide) was cut to these same dimensions. The facings were placed on either side of the foam and anchored in place using two 1" wide Kapton TM tape anchors along the leading edge of the sample. The warp direction of the fabric was aligned along the length (25") direction of the panel. The belt press was set to a constant temperature of 650° F. with a belt speed of 15"/min. (residence time about 32 sec. in the heat zone). The gap between the upper and lower belts was set to produce a finished sample thickness of 0.516" or 100% of the theoretical thickness. The leading edge of the sample was inserted into the belt press. A Kapton TM release film was used when processing the sample. After consolidation the release film and tape anchors were removed. The average sample thickness, as measured by the micrometer, was 0.540".

This panel was cut into five 3"×24" strips for long beam flex evaluation as described in test Boeing Mil. Spec. 256, page 29. The average flex strength was determined to be 14.7 ksi at maximum machine deflection. An identical sample was manufactured but with the warp direction of the fabric perpendicular to the length of the foam cored panel. This sample was cut into 3"×12" samples for climbing drum peel evaluation. The average peel strength was determined to be 33 lbs. per 3" sample.

Example 11

The components of the laminate were dried for at least 2 hours at 120° C. and then laid up in the following manner. Identical facings as described in Example 9 were placed on each side of a piece of foam (Last-A-Foam TM FR 3718 polyurethane) measuring 16"×25" with the warp direction of the fabric parallel to the length of the panel. Two Kapton TM tape strips were used to anchor the facings to the core along the leading edge of the panel. The panel was consolidated using a constant belt press temperature of 600° F. and a constant belt speed of 12"/min. (residence time about 48 sec. in the heat zone). Kapton TM release film was used during consolidation. After consolidation the release film and tape anchors were removed. The average panel thickness was measured to be 0.541".

This panel was cut into samples for long beam flex evaluation. The average flex strength was determined to be 13 ksi at maximum machine deflection. An identical sample was manufactured with the warp direction perpendicular to the length of the panel for climbing drum peel evaluation. Manufacturing conditions for this sample were 650° F. belt temperature and 15"/min. belt speed (residence time about 32 sec. in the heat zone). The average peel strength was determined to be 27 lbs./3" sample.

Example 12

The components of the laminate were dried for at least 2 hours at 120° C. and then laid up in the following manner. Identical facings of amorphous (60/40) PEKK film and Kevlar TM fabric Style 281 were placed on either side of a foam (Last-A-Foam TM FR 10118 polyisocyanurate) core. Two 1" wide strips of Kapton TM were used to anchor the facings in place along the leading edge of the sample. All parts of the lay-up were cut to dimensions of 12"×16×. The warp direction of the fabric was laid parallel to the length of the panel. The panel was consolidated using a constant belt press temperature of 650° F. and a constant belt speed of 12"/min. (residence time about 48 sec. in the heat zone). The gap between the upper and lower belts was set to achieve a finished panel thickness of 0.516". The Kapton TM release film was used during panel processing. After consolidation the Kapton TM film and tape were removed. The panel was cut into four 3"×12" samples with the warp direction of the fabric parallel to the 3" dimension. The average peel strength of this panel by the climbing drum peel strength test method was determined to be 27 lbs./3" sample.

Example 13

The components of the laminate were dried for at least 2 hours at 120° C. and then laid up in the following manner. One piece of amorphous nylon film (0.008" thick) was placed on each side of a flat woven 5×5 harness satin fabric (15 oz./sq. yd. code, T5674-34) made from E-glass/amorphous nylon impregnated tow (Binnersley and Krueger U.S. Pat. No. 4,640,861) to form the facing. Identical facings were placed on each side of a piece of honeycomb of Nomex TM (3 lbs./sq. ft., ⅛" cell, ½" thick). The warp direction of the facing fabric was aligned with the ribbon direction of the core and the predominently warp faced side of the fabric placed closest to the core. The facing layers were anchored to the core with (3) 1" wide Kapton TM tape strips along the leading edge of the sample. The belt press was set to a constant temperature of 650° F. and a belt speed of 15"/min. (residence time about 32 sec. in the heat zone). The gap between the upper and lower belts was set to achieve a total sample thickness of 0.504". A Kapton TM release sheet was placed over both sides of the entire laminate according to the above described procedure. The front edge of the sample, perpendicular to the warp direction of the facing fabric and containing the Kapton TM tape anchors, was inserted into the belt press. The Kapton TM release sheet and the tape anchors were removed from the sample. The average sample thickness, as measured by micrometer, was found to be 0.507". A Climbing Drum Peel test was performed on three samples (in the fabric warp direction) and had an average result of 19.1 lbs./3" sample.

Example 14

The components of this panel were dried for at least 2 hours at 120° C. and then laid up in the following manner. A piece of amorphous PEKK (60/40) film (Melt index 150) was laid over a piece of ½" Nomex TM honeycomb core. A piece of PEEK/AS4 uni tape (ICI Fiberite APC-2/AS-4 12" uni tape, batch No. N89-0038, roll No. 11) was then placed upon the core with the fibers in the tape running perpendicular to the ribbon direction of the core. Another piece of the same tape was then placed on the stack, but with the AS-4 fibers running parallel to the ribbon direction of the core. The tape layup was repeated in the same fashion for the opposite side of the core, including the layer of PEKK film. The facing layers were fastened to the core material with Kapton TM tape along the leading edge of the sample for insertion into the belt press (an edge perpendicular to the ribbon direction of the core). The belt press was set up for a constant temperature of 680° F. and a belt speed of 15"/min. (residence time about 32 secs. in the heat zone). The gap between the upper and lower belts was fixed to a final sample thickness of 0.516". A Kapton TM release sheet was placed over both sides of the entire laminate. The leading edge of the layup was inserted into the belt press. Once consolidated, the Kapton TM release film and the Kapton TM tape were removed from the sample. The average sample thickness as measured by micrometer was found to be 0.512".

The completed panel was then cut into three 3"×24" specimens (length parallel to the ribbon direction of the core) and tested for flexural strength and modulus according to method BMS-256.
Test results:
Long Beam Flex
Modulus—Average 174
Strength—27754 psi Another sample was fabricated in the above manner except that the facing ply orientation of the uni graphite tape was reversed to give maximum peel strength. Therefore, the 0° axis of the fibers was placed parallel to the ribbon direction of the honeycomb core and the outer ply was placed perpendicular to the core ribbon direction. Peel strength samples were then cut in a perpendicular orientation to the core ribbon direction. The measured peel value was determined to be 13.6 lbs./3" sample.

Example 15

The components of the laminate were laid up in the following manner. Two strips of foam measuring 17.5"×2" and two strips measuring 8"×2" were cut from a sheet of Rohacell TM 200WF foam. These foam strips were assembled into a frame 17.5" long and 12" wide held together with 2.5" regular screws inserted into the side approximately ½" from the panel edge. A piece of honeycomb was cut to fit tightly into the center of the frame. Identical panel facings composed of two pieces of amorphous (60/40 T/I) PEKK film (150 melt index) on either side of a Kevlar TM Style 285 fabric were assembled and placed on either side of the honeycomb core/foam frame assembly. One inch wide strips of Kapton TM tape were used to anchor the panel facings in place along the leading edge of the sample. The belt press was set to a constant temperature of 650° F. with a belt speed of 15"/min. Sample residence time in the heat zone was approximately 32 secs. The gap between the upper and lower belts was set to produce a finished sample thickness of 0.516" or 100% of the theoretical thickness. The sample was inserted into the belt process with Kapton TM film as the release agent. After consolidation, the release film and tape anchors were removed. Visual inspection of the panel suface indicates that minimal space exists at the foam/honeycomb interface. The finished average thickness of the foam trimmed portion of the panel, as measured by a micrometer, was 0.539", and the average thickness of the honeycomb-cored portion of the sample was measured as 0. 536".

What is claimed is:

1. A panel comprising: a core member in the form of a honeycomb structure of aramid paper and thermoplastic resin sheet material reinforced with a fiber selected from the group consisting of aramid, carbon and glass bonded to both sides of said core member to form facings therefor, the thermoplastic resin being between 30 to about 65 weight percent of each said facing, said honeycomb structure having a plurality of adjoining cells formed of continuous upstanding walls, said walls being folded at each end in the same direction to increase the surface area of said honeycomb structure contacting each said facing, the peel strength between each facing and the core of the panel being greater than 10 lbs./3" sample.

2. The panel according to claim 1, in which said thermoplastic resin sheet material is polyetherketoneketone.

3. The panel according to claim 1, wherein said thermoplastic resin material is polyetherimide.

4. The panel according to claim 1, wherein said thermoplastic resin material is polyetheretherketone.

5. The panel according to claim 1, said core member being a honeycomb structure edge trimmed with foam.

* * * * *